Dec. 4, 1951 W. J. VOLCKHAUSEN 2,577,168
TAKEUP REEL MECHANISM
Filed July 12, 1950 6 Sheets-Sheet 1

INVENTOR
W. J. VOLCKHAUSEN
BY
*W.C. Parnell*
ATTORNEY

Dec. 4, 1951  W. J. VOLCKHAUSEN  2,577,168
TAKEUP REEL MECHANISM
Filed July 12, 1950  6 Sheets-Sheet 2
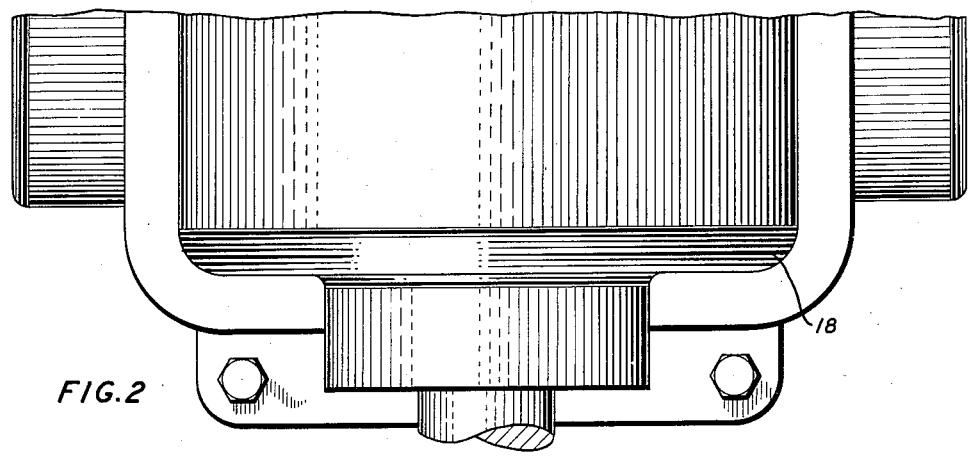
FIG.2
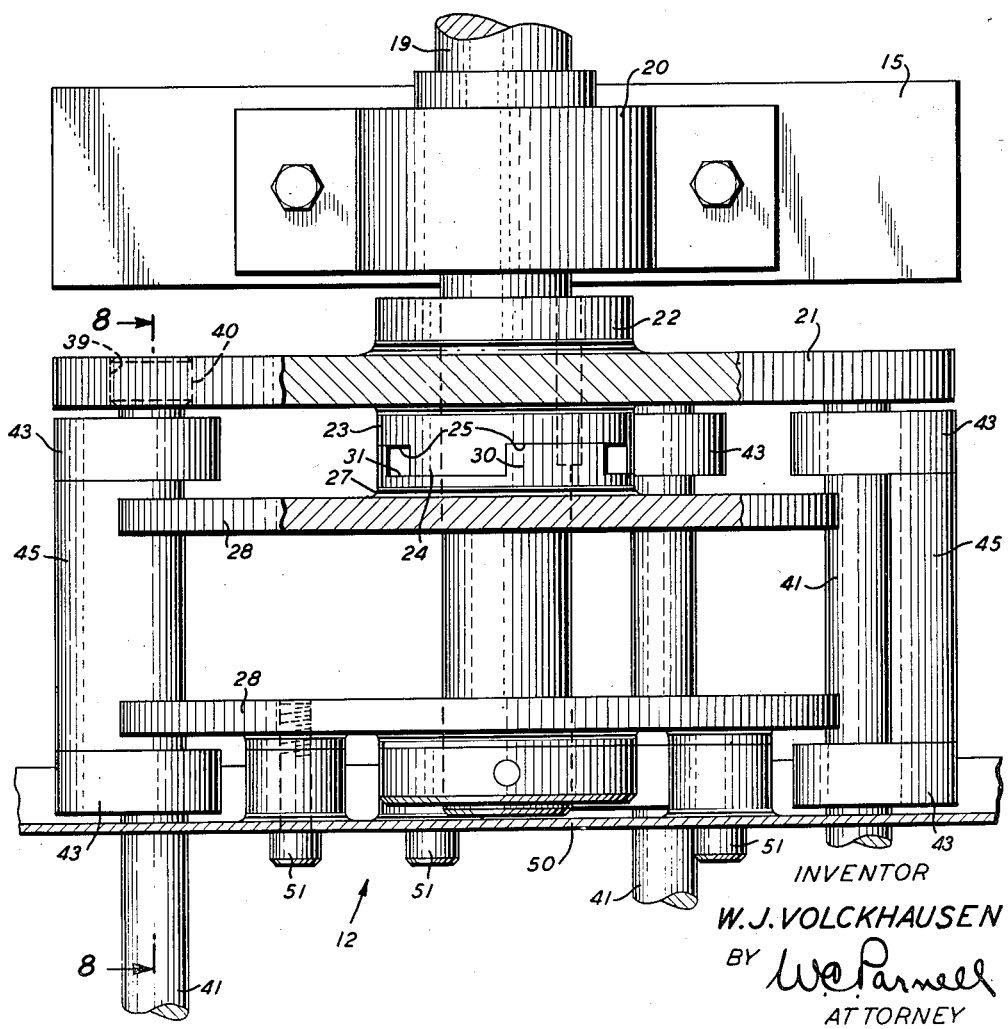
INVENTOR
W.J. VOLCKHAUSEN
BY W.C. Parnell
ATTORNEY Dec. 4, 1951 W. J. VOLCKHAUSEN 2,577,168
TAKEUP REEL MECHANISM
Filed July 12, 1950 6 Sheets-Sheet 3
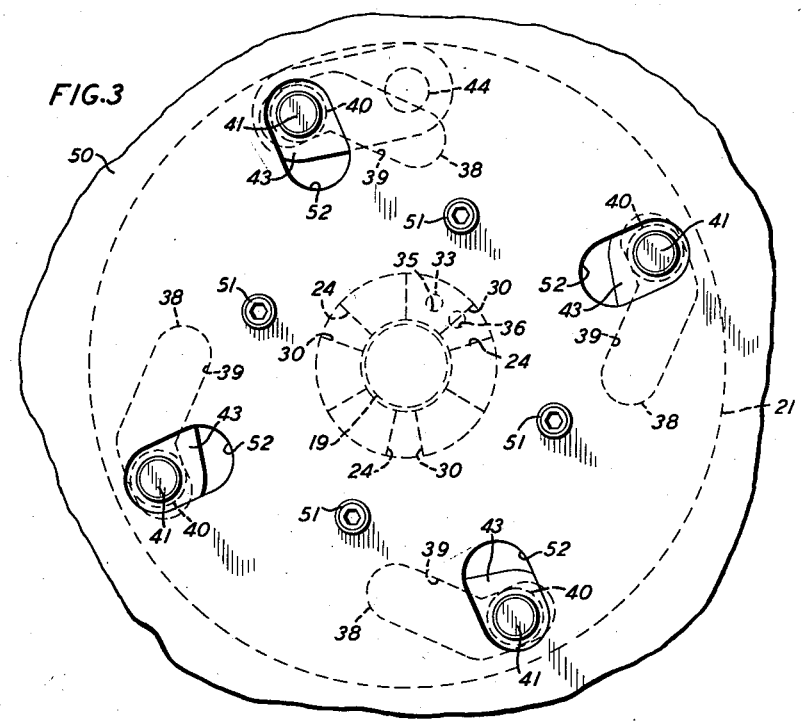
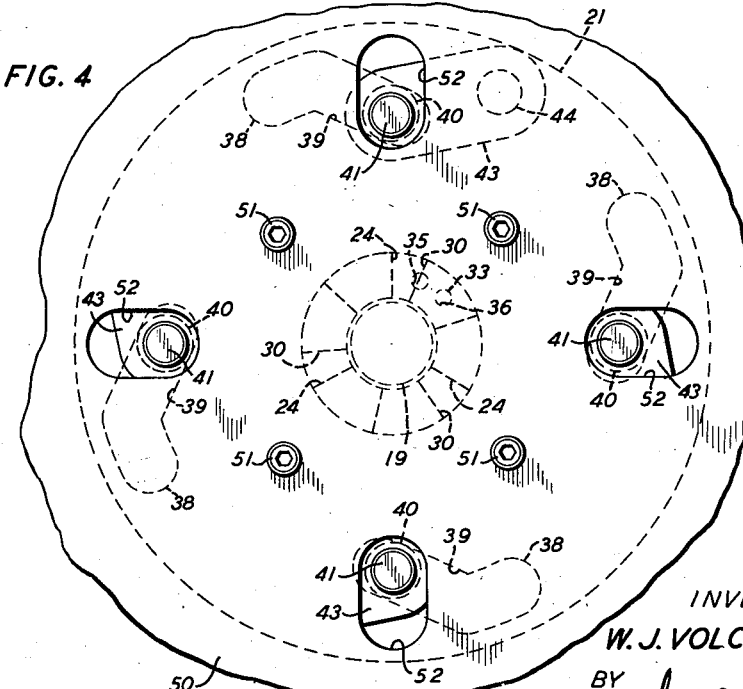
INVENTOR
W. J. VOLCKHAUSEN
BY
ATTORNEY Dec. 4, 1951 W. J. VOLCKHAUSEN 2,577,168
TAKEUP REEL MECHANISM
Filed July 12, 1950 6 Sheets-Sheet 4
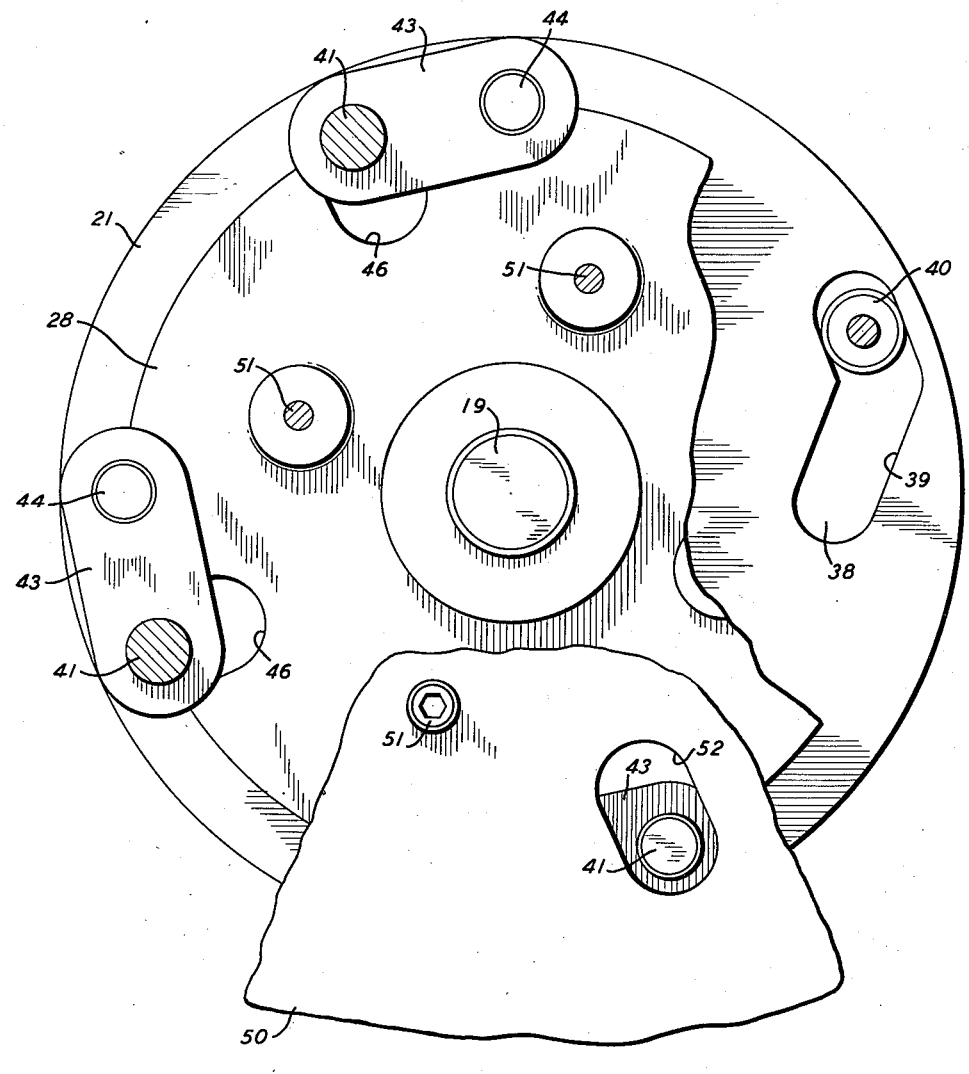
INVENTOR
W. J. VOLCKHAUSEN
BY
ATTORNEY Dec. 4, 1951 W. J. VOLCKHAUSEN 2,577,168
TAKEUP REEL MECHANISM
Filed July 12, 1950 6 Sheets-Sheet 5

INVENTOR
W. J. VOLCKHAUSEN
BY *W. C. Parnell*
ATTORNEY

Dec. 4, 1951  W. J. VOLCKHAUSEN  2,577,168
TAKEUP REEL MECHANISM
Filed July 12, 1950  6 Sheets–Sheet 6

INVENTOR
W.J. VOLCKHAUSEN
BY
ATTORNEY

Patented Dec. 4, 1951

2,577,168

UNITED STATES PATENT OFFICE 2,577,168

TAKEUP REEL MECHANISM

Walter J. Volckhausen, Teaneck, N. J., assignor to Western Electric Company, Incorporated, New York, N. Y., a corporation of New York Application July 12, 1950, Serial No. 173,281

4 Claims. (Cl. 242—113)

This invention relates to take-up apparatus and more particularly to apparatus for taking up sheathing material removed from cable.

Occasionally, under test, defects are discovered in manufactured electrical cables which render them undesirable for use yet the materials of the cables are worth salvaging. One of the first steps in this method is the removal of the cable sheath. Certain of the cables have more than one protective sheath about the numerous electrical conductors forming the cable core. In the present instance an outer plastic sheath has already been removed and an inner aluminum sheath is to be removed from the cable unit or core of electrical conductors. The aluminum sheath is opened longitudinally and, if desired, drawn between rollers to flatten the sheath. In other cases, however, the rolling operation may be eliminated and the aluminum sheath advanced directly to the take-up apparatus.

It is the object of the present invention to provide take-up mechanism which is simple in structure but highly efficient in winding material such as aluminum into coil-like formation.

With this and other objects in view, the invention comprises a take-up apparatus including a circular arrangement of substantially parallel arms upon which the material may be wound when the arms are rotated about a common axis. The arms are supported for movement between their outer winding positions and their inner unloading positions under the control of a mechanism which will force the arms into their winding positions during driving of the arms about the axis to wind the material thereon, the mechanism being actuable when the driving means is at rest to move the arms into their unloading positions.

More specifically the apparatus includes two like take-up units whereby, after one has been filled, the material may be cut and wound on the second unit while the coil of material is being removed from the first unit. Structurally the arms are supported by pivoted levers under the control of a cam fixed to the driving means but free to move a limited distance relative to the main support for the arms so that the driving force for the cam will move the arms into their outer winding positions and hold the arms in this position at all times during the winding of the material. When the driving mechanism is deenergized the support for the arms may be moved a given distance relative to the cam to move the arms simultaneously inwardly toward the axis, freeing the material for removal from the arms.

Other objects and advantages will be apparent from the following detailed description when considered in conjunction with the accompanying drawings wherein:

Fig. 2 is an enlarged fragmentary top plan view of one of the units of the take-up apparatus;

Fig. 3 is a fragmentary front elevational view of one of the units illustrating the position of the cam to hold the arms in their winding positions;

Fig. 4 is a view similar to Fig. 3 showing the arms in their unloading positions;

Figs. 5 and 6 are vertical section views through one of the units at different positions illustrating the detail structures of the units;

Figure 1:
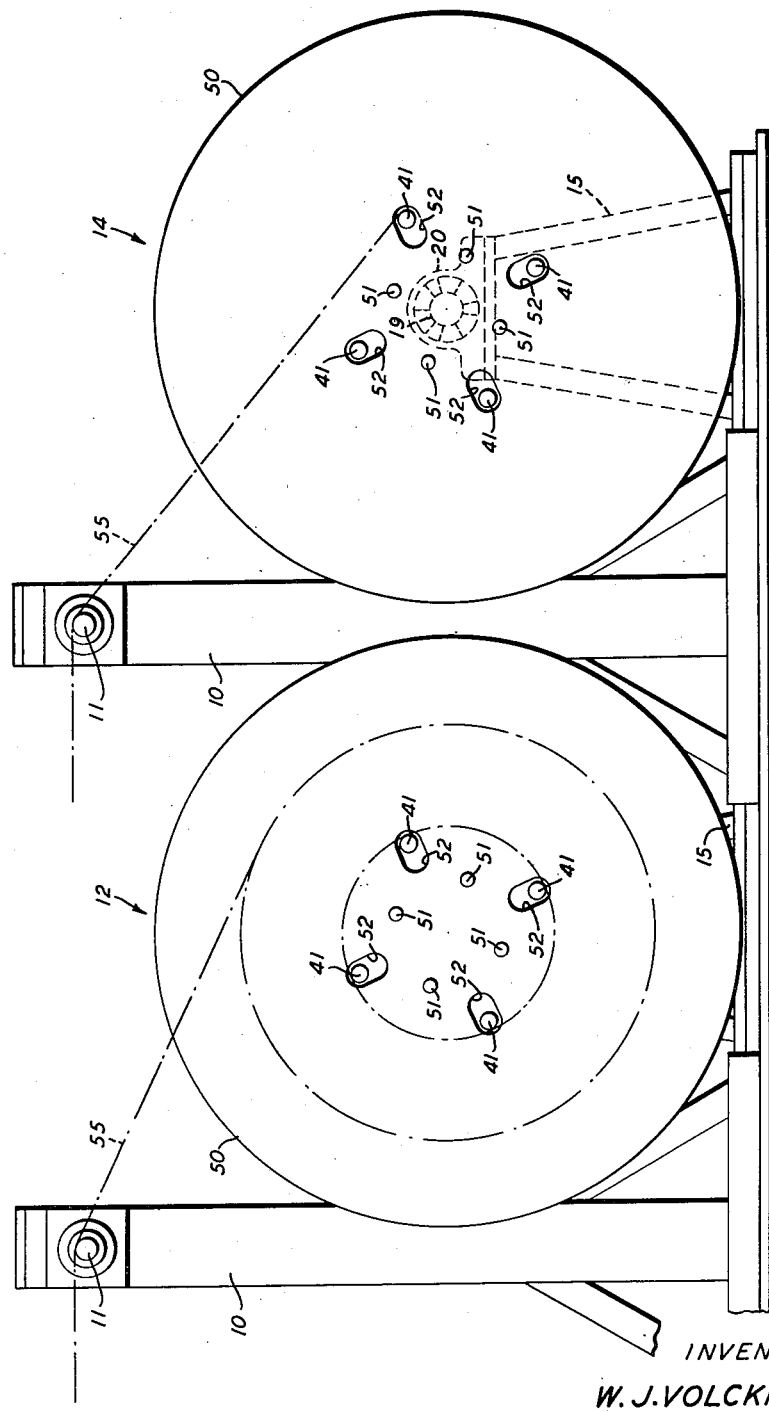
Fig. 1 is a front elevational view of the take-up apparatus.
Figure 7:
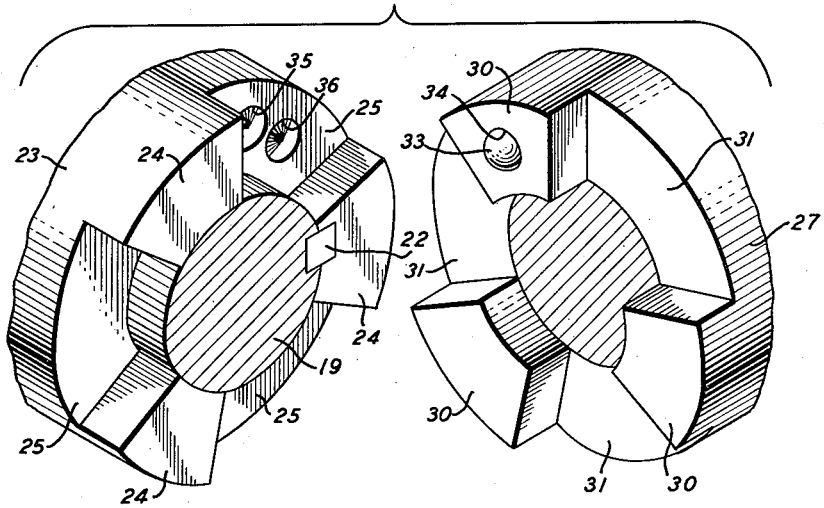
Fig. 7 is a somewhat exploded isometric view of the portions of the clutch between the cam and the main support for the arms.
Figure 8:
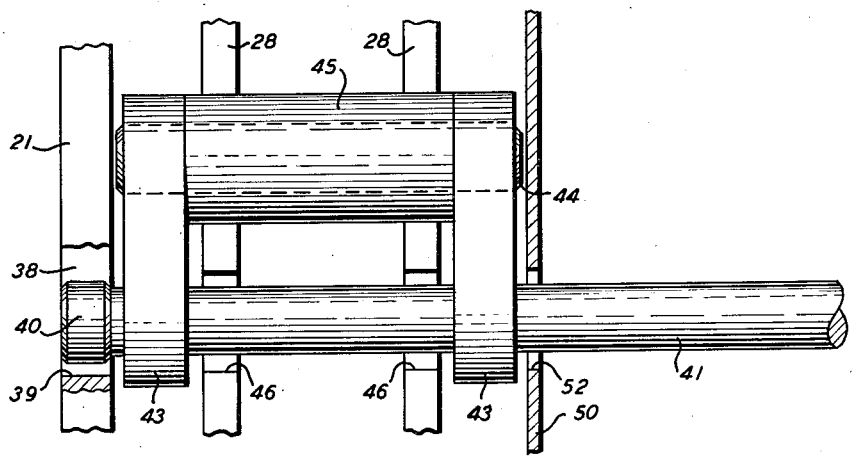
Fig. 8 is a fragmentary detail view of one of the arms and the associated structure.

Referring now to the drawings, attention is first directed to Fig. 1 which illustrates a frame-like structure 10 with guide rollers 11 for the units 12 and 14 supported on vertical portions 15 of the frame. The units 12 and 14 are identical structures and a description of one unit will apply to both. Attention is now directed to unit 12 which is shown in detail in the other figures. In viewing Fig. 2 the power means for the unit 12 is identified at 18 and includes an output shaft 19 journaled in a bearing 20 mounted on a frame member 15. The shaft 19 has a disc-like cam 21 keyed at 22 thereto and provided with a clutch member 23 shown more in detail in Fig. 7. The clutch member 23 includes equally spaced projections 24 with intermediate recesses 25 to inter-engage a clutch member 27 of the main support 28. The clutch member 27 is substantially identical to the clutch member 23 in that it is provided with spaced projections 30 and intermediate recesses 31, attention being directed to the fact that the projections 24 and 30 of each clutch member are shorter in width or circumferential distance than their associated recesses 25 and 31, whereby there may be relative rotation of the clutch members a given distance which is sufficient to move the arms, as hereinafter described, between their winding and unloading positions. A suitable means is provided tending to lock the clutch member 27 in either one of these positions. This means includes a ball member 33 movably disposed a limited distance in an aperture 34 of one of the projections 30 and backed by a spring, not shown, normally urging the ball member outwardly so that it will enter either one of two concaved recesses 35 and 36, in its associated main recess 35 depending upon whether the arms are in their winding or unloading positions.

Figure 6:
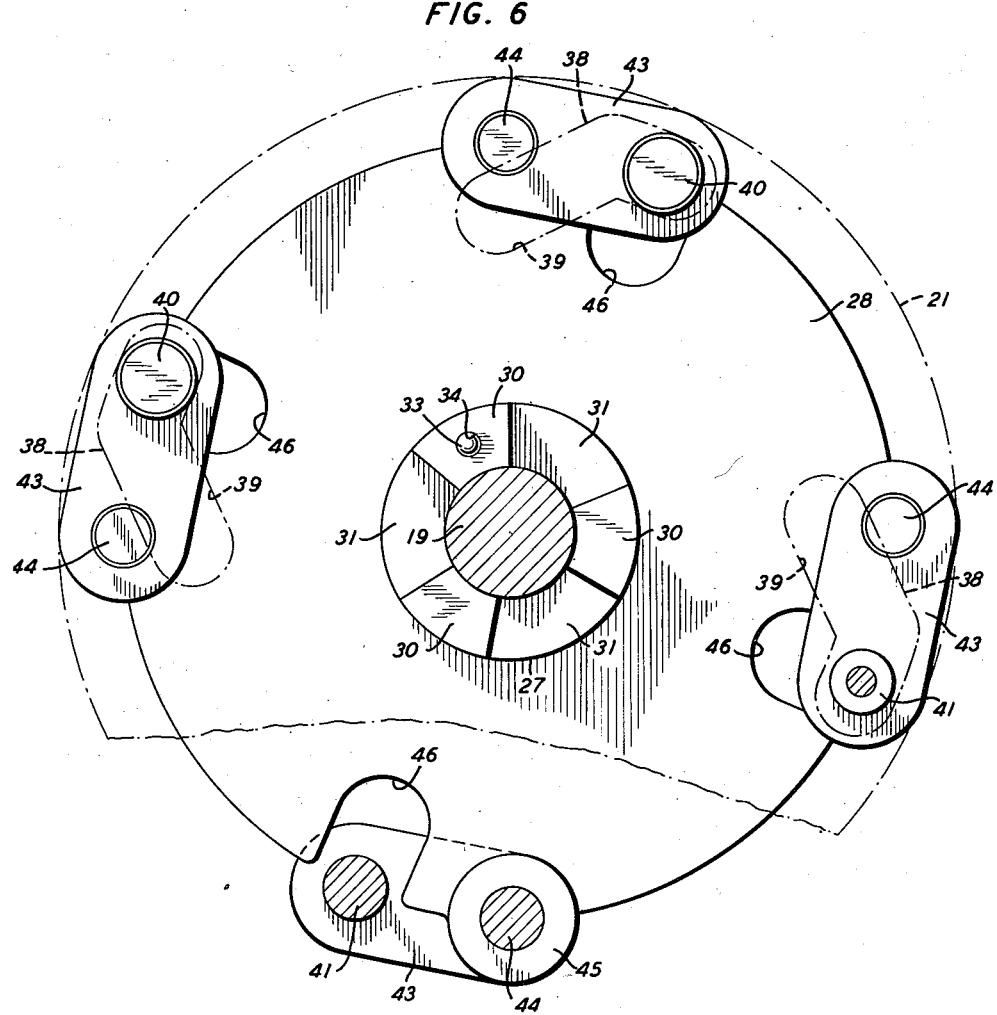

The cam 21 has equally spaced apertures 38 of the contours shown particularly in Figs. 3, 4 and 6, providing cam surfaces 39 for rollers or the like 40 mounted on the inner ends of arms 41. The arms 41 are supported by levers 43 mounted on pivots 44 which are carried by the main support 28. The support 28 is composed of spaced disc-like members connected by the bearings 45 for the pivots 44 and mounted freely on the shaft 19 the connection between the main support 28 and the shaft being through the clutch members 27 and 23. Notches 46 are formed in the outer edges of the members of the support 28 to allow rocking movement of the arms 41 between their outer or winding positions and their inner or unloading positions. A head 50 secured to the support 28 by bolts 51 has elongate apertures 52 through which the arms 41 extend and against which the material 55 may be wound as it is taken up on the arms 41.

Considering now the operation of the take-up apparatus, let it be assumed that the unit 12 is empty and that the leading end of the material 55 is secured in any suitable manner to one of the arms 41 which at this time will be in their unloading positions as shown in Fig. 4. The power means 18 is energized rotating the shaft 19 clockwise, viewing Figs. 3 and 4, driving the cam 21 in the same direction. The spring-pressed ball 33 in the recess 35 may cause the support 28 to rotate with the cam carrying the arms about the axis of rotation in their inner and unloading positions until the pull of the material tends to stop rotation of the arms and their support, affecting relative movement of the cam 21 and the support 28 with the arms 41 to move the arms into the winding positions shown in Fig. 3. Although the operation just described is, theoretically, what should happen, in certain instances the rapid start of the cam to rotate will most likely disconnect the latching means 33—36 and force the arms into their winding positions without waiting for the material to create a drag on the arms and support to bring about shifting of the arms from their inner unloading positions to their outer unwinding positions. However, the driving force tending to rotate the cam clockwise and the drag of the material tending to retard rotary motion of the arms and their support in the same direction will assure maintenance of the arms in their winding positions at all times during operation of the unit 12 until the operator desires to stop the unit when it has been suitably filled with the material. Furthermore, the latch 33—35 will prevent possible movement of the arms into their unloading positions after de-energization of the driving means and during deceleration of the mechanism moved thereby.

In transferring the material from one unit to the other, the filled unit, for example, unit 12 will be stopped after which the material is cut and the new leading end of the material is advanced over the guide roll 11 for the unit 14, and secured to one of the arms 41. The unit 14 may then be driven. As soon as the power means 18 for the unit 14 is energized, the arms 41 are moved into their outer winding positions shown in Fig. 1, and at this time, during the continued winding of the material on the unit 14, the operator may remove the wound material from the unit 12. This may be accomplished by gripping the head 50 and rotating it clockwise a given distance. While this takes place the driving mechanism 18 which in the present instance includes a motor and a speed reducing unit, will act as a brake to hold the cam 21 against rotation, allowing movement of the arms with their support 28 from the position shown in Fig. 3 to the position shown in Fig. 4, moving the arms toward the axis of the unit thus freeing the material for removal from the unit 12. This is accomplished before the unit 14 is filled with the material and the unit 12 is now ready to receive the next supply of material 55 to be wound thereon.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A takeup apparatus for material comprising a drive shaft, energizable power means for driving the shaft in a given winding direction, a support mounted concentric with the shaft for rotation relative thereto, a clutch connecting the support to the shaft adapted to permit limited relative movement thereof, a plurality of arms parallel with each other and the axis of the shaft disposed at spaced positions in circular arrangementt about the support, means disposed adjacent like ends of the arms to connect the arms to the support for rotation with the support and for like swinging movements of the arms between their winding positions and their unloading positions leaving the major portions of the lengths of the arms to support the material to be wound thereon, and an element fixedly mounted on the shaft adjacent the support and having the cam-like portions positioned to engage their respective arms to force the arms to swing outwardly into their winding positions upon energization of the power means and to maintain the arms in this position during energization of the power means.

2. A takeup apparatus for material comprising a drive shaft, energizable power means for driving the shaft in a given winding direction, a support mounted concentric with the shaft for rotation relative thereto, a clutch connecting the support to the shaft adapted to permit limited relative movement thereof, a plurality of arms parallel with each other and the axis of the shaft disposed at spaced positions in circular arrangement about the support, means disposed adjacent like ends of the arms to connect the arms to the support for rotation with the support and for like swinging movements of the arms between their winding positions and their unloading positions leaving the major portions of the lengths of the arms to support the material to be wound thereon, and an element fixedly mounted on the shaft adjacent the support and having cam-like portions positioned to engage their respective arms to force the arms to swing outwardly into their winding positions upon energization of the power means and to maintain the arms in this position during energization of the power means, the element with its cam-like portions when unoperated causing swinging movement of the arms toward the shaft into their unloading positions when the support is moved with the arms relative to the element.

3. A takeup apparatus for material comprising a drive shaft, energizable power means for driving the shaft in a given winding direction, a support mounted concentric with the shaft for rotation relative thereto, a clutch connecting the support to the shaft adapted to permit limited relative movement thereof, a plurality of arms parallel with each other and the axis of the shaft disposed at spaced positions in circular arrangement about the support, levers mounted on like ends of the arms and pivotally secured at spaced positions to the support whereby the arms will be caused to move in their circuitous path with the support when rotating with the shaft and free to swing about the pivots of their levers between their inner unloading positions and their outer winding positions leaving the major portions of the lengths of the arms to support the material to be wound thereon, and an element fixedly mounted on the shaft adjacent the support and having cam-like portions positioned to engage their respective arms to force the arms to swing outwardly into their winding positions upon energization of the power means and to maintain the arms in this position during energization of the power means.

4. A takeup apparatus for material comprising a drive shaft, energizable power means for driving the shaft in a given winding direction, a support mounted concentric with the shaft for rotation relative thereto, a clutch connecting the support to the shaft adapted to permit limited relative movement thereof, a plurality of arms parallel with each other and the axis of the shaft disposed at spaced positions in circular arrangement about the support, levers mounted on like ends of the arms and pivotally secured at spaced positions to the support whereby the arms will be caused to move in their circuitous path with the support when rotating with the shaft and free to swing about the pivots of their levers between their inner unloading positions and their outer winding positions leaving the major portons of the lengths of the arms to support the material to be wound thereon, and an element fixedly mounted on the shaft adjacent the support and having cam-like portions positioned to engage their respective arms to force the arms to swing outwardly into their winding positions upon energization of the power means and to maintain the arms in this position during energization of the power means, the elements with its cam-like portions when unoperated causing swinging movement of the arms with their levers about the pivots therefor into their unloading positions when the support is moved with the arms and levers relative to the element.

WALTER J. VOLCKHAUSEN.

REFERENCES CITED

The following references are of record in the file of this patent:

UNITED STATES PATENTS

| Number | Name | Date |
|---|---|---|
| 436,824 | Chatfield | Sept. 23, 1890 |
| 656,264 | Revel | Aug. 21, 1900 |
| 934,964 | Ethridge | Sept. 21, 1909 |
| 1,017,936 | Welty et al. | Feb. 20, 1912 |
| 1,088,282 | Hudson | Feb. 24, 1914 |
| 1,443,336 | Atwood | Jan. 30, 1923 |
| 1,530,991 | Forbes | Mar. 24, 1925 |
| 1,858,607 | Whalen | May 17, 1932 |
| 1,980,138 | Johnson et al. | Nov. 6, 1934 |
| 2,009,177 | Guseo et al. | July 23, 1935 |
| 2,116,057 | Yoder | May 3, 1938 |